(12) United States Patent
Bohn et al.

(10) Patent No.: US 9,069,531 B2
(45) Date of Patent: Jun. 30, 2015

(54) PORTABLE DEVICE AND MOBILE PHONE WITH DOUBLE HINGE TORSION BAR

(71) Applicant: Microsoft Corporation, Redmond, WA (US)

(72) Inventors: David D. Bohn, Fort Collins, CO (US); Paul M. O'Brien, Sammamish, WA (US); Christopher Bramley Fruhauf, San Anselmo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/298,107

(22) Filed: Jun. 6, 2014

(65) Prior Publication Data
US 2014/0287804 A1    Sep. 25, 2014

Related U.S. Application Data

(63) Continuation of application No. 13/027,021, filed on Feb. 14, 2011, now Pat. No. 8,780,570.

(51) Int. Cl.
*H05K 5/00* (2006.01)
*G06F 1/16* (2006.01)
*H04M 1/02* (2006.01)

(52) U.S. Cl.
CPC .............. *G06F 1/1681* (2013.01); *Y10T 16/554* (2013.01); *Y10T 16/558* (2013.01); *Y10T 29/49826* (2013.01); *H04M 1/022* (2013.01); *H04M 1/0218* (2013.01)

(58) Field of Classification Search
USPC .................. 361/755; 455/575.1–575.3, 575.7
See application file for complete search history.

(56) References Cited

U.S. PATENT DOCUMENTS

| | | | |
|---|---|---|---|
| 4,050,116 A | 9/1977 | Salice |
| 4,949,426 A | 8/1990 | Komaki |
| 5,052,078 A | 10/1991 | Hosoi |
| 5,077,551 A | 12/1991 | Saitou |
| 5,268,816 A | 12/1993 | Abell, Jr. et al. |
| 5,335,142 A | 8/1994 | Anderson |
| 5,390,075 A | 2/1995 | English et al. |
| 5,394,297 A | 2/1995 | Toedter |
| 5,581,440 A | 12/1996 | Toedter |

(Continued)

FOREIGN PATENT DOCUMENTS

JP    06310874    11/1994

OTHER PUBLICATIONS

"Final Office Action", U.S. Appl. No. 13/024,506, Nov. 15, 2013, 7 pages.

(Continued)

*Primary Examiner* — Hung S Bui
(74) *Attorney, Agent, or Firm* — Jeremy Snodgrass; Judy Yee; Micky Minhas

(57) ABSTRACT

In embodiments of a double hinge torsion bar, a portable device includes a first housing integrated with a display device, and a second housing movably coupled to the first housing. Double hinges attach to the first and second housings of the portable device, and the double hinges are operable to open and close the first and second housings relative to each other. A torsion bar movably couples the double hinges to open and close at approximately a same timing rate, which can prevent the double hinges from binding when the first and second housings are opened and closed relative to each other.

20 Claims, 4 Drawing Sheets

(56) References Cited

U.S. PATENT DOCUMENTS

| | | | |
|---|---|---|---|
| 5,661,797 | A | 8/1997 | Leman et al. |
| 5,827,082 | A | 10/1998 | Laine |
| 6,108,868 | A | 8/2000 | Lin |
| 6,223,393 | B1 | 5/2001 | Knopf |
| 6,230,365 | B1 | 5/2001 | Lu |
| 6,252,767 | B1 | 6/2001 | Carlson |
| 6,359,776 | B2 | 3/2002 | Carlson |
| 6,388,872 | B1 | 5/2002 | Liao et al. |
| 6,404,622 | B1 | 6/2002 | Chen |
| 6,553,625 | B2 | 4/2003 | Lin et al. |
| 6,692,275 | B2 | 2/2004 | Lee |
| 6,895,638 | B2 | 5/2005 | Lin |
| 7,054,147 | B2 | 5/2006 | Maatta et al. |
| 7,058,433 | B2 | 6/2006 | Carpenter |
| 7,106,579 | B2 | 9/2006 | Maskatia et al. |
| 7,155,266 | B2 | 12/2006 | Stefansen |
| 7,155,780 | B2 | 1/2007 | Chen |
| 7,266,864 | B2 | 9/2007 | Kim |
| 7,299,523 | B2 | 11/2007 | Zou |
| 7,374,424 | B1 | 5/2008 | Nurmi et al. |
| 7,414,834 | B2 | 8/2008 | Ukonaho et al. |
| 7,483,723 | B2 | 1/2009 | Soderlund |
| 7,484,271 | B2 | 2/2009 | Oshima et al. |
| 7,515,707 | B2 | 4/2009 | Ka et al. |
| 7,596,832 | B2 | 10/2009 | Hsieh et al. |
| 7,688,970 | B2 | 3/2010 | Garcia et al. |
| D616,405 | S | 5/2010 | Anand et al. |
| 7,719,827 | B2 | 5/2010 | Mihara et al. |
| 7,729,720 | B2 | 6/2010 | Suh et al. |
| 7,738,930 | B2 | 6/2010 | Petrella |
| 7,787,912 | B2 | 8/2010 | Saila |
| 7,787,914 | B2 | 8/2010 | Ahn et al. |
| 7,898,815 | B2 | 3/2011 | Tanaka et al. |
| 7,925,309 | B2 | 4/2011 | Soderlund |
| 7,930,803 | B2 | 4/2011 | Ueyama et al. |
| 7,933,118 | B2 | 4/2011 | Chiu et al. |
| 7,974,085 | B2 | 7/2011 | Ouyang |
| 8,004,833 | B2 | 8/2011 | Tseng et al. |
| 8,104,144 | B2 | 1/2012 | Wang et al. |
| 8,208,249 | B2 | 6/2012 | Chin et al. |
| 8,289,688 | B2 | 10/2012 | Behar et al. |
| 8,441,791 | B2 | 5/2013 | Bohn et al. |
| 8,451,601 | B2 | 5/2013 | Bohn |
| 8,773,849 | B2 | 7/2014 | Bohn et al. |
| 8,780,570 | B2 | 7/2014 | Bohn et al. |
| 8,804,324 | B2 | 8/2014 | Bohn et al. |
| 2001/0003707 | A1 | 6/2001 | Moriya |
| 2001/0009499 | A1 | 7/2001 | Carlson |
| 2002/0069483 | A1 | 6/2002 | Savolainen et al. |
| 2004/0077199 | A1 | 4/2004 | Winstead et al. |
| 2004/0209641 | A1 | 10/2004 | Hong |
| 2004/0212968 | A1 | 10/2004 | Lin |
| 2004/0246667 | A1 | 12/2004 | Maskatia et al. |
| 2005/0055807 | A1 | 3/2005 | Maatta et al. |
| 2005/0079900 | A1 | 4/2005 | Li |
| 2005/0239520 | A1 | 10/2005 | Stefansen |
| 2006/0080805 | A1 | 4/2006 | Takagi |
| 2006/0171529 | A1 | 8/2006 | Iikura |
| 2006/0185122 | A1 | 8/2006 | Saito et al. |
| 2006/0198513 | A1 | 9/2006 | Eldon |
| 2006/0246964 | A1 | 11/2006 | Castaneda et al. |
| 2007/0000088 | A1 | 1/2007 | Mao et al. |
| 2007/0054710 | A1 | 3/2007 | Pan |
| 2007/0107163 | A1 | 5/2007 | Barnett |
| 2008/0307608 | A1 | 12/2008 | Goto |
| 2009/0000062 | A1 | 1/2009 | Yamanami |
| 2009/0147458 | A1 | 6/2009 | Wang et al. |
| 2009/0151118 | A1 | 6/2009 | Karkkola et al. |
| 2009/0156260 | A1 | 6/2009 | Derengowski et al. |
| 2009/0227301 | A1 | 9/2009 | Lindvall |
| 2009/0265890 | A1 | 10/2009 | Endo et al. |
| 2009/0291719 | A1 | 11/2009 | Christensen |
| 2010/0071155 | A1 | 3/2010 | Ueyama et al. |
| 2010/0088853 | A1 | 4/2010 | Degner et al. |
| 2010/0232096 | A1 | 9/2010 | Chen |
| 2010/0304799 | A1 | 12/2010 | Leung et al. |
| 2011/0102986 | A1 | 5/2011 | Asakura et al. |
| 2011/0265288 | A1 | 11/2011 | Chiang |
| 2012/0162866 | A1 | 6/2012 | Bohn |
| 2012/0194972 | A1 | 8/2012 | Bohn et al. |
| 2012/0206864 | A1 | 8/2012 | Bohn |
| 2012/0206893 | A1 | 8/2012 | Bohn |
| 2012/0257368 | A1 | 10/2012 | Bohn |
| 2012/0307472 | A1 | 12/2012 | Bohn et al. |

OTHER PUBLICATIONS

"Final Office Action", U.S. Appl. No. 13/027,021, Dec. 17, 2013, 8 pages.

"Final Office Action", U.S. Appl. No. 13/084,284, Apr. 12, 2013, 22 pages.

"Foreign Office Action", CN Application No. 201210029063.0, Jan. 26, 2014, 11 Pages.

"Foreign Office Action", CN Application No. 201210029063.0, Jun. 4, 2014, 13 Pages.

"Fpc (Mobile Phone Flex Cable)", Retrieved from: <http://richli.en.made-in-china.com/product/FeBEzQgvHJic/China-Fpc-Mobile-Phone-Flex-Cable-.html> on Oct. 11, 2010, 2010, 1 page.

"Non-Final Office Action", U.S. Appl. No. 13/024,506, Apr. 4, 2014, 8 pages.

"Non-Final Office Action", U.S. Appl. No. 13/024,506, May 2, 2013, 8 pages.

"Non-Final Office Action", U.S. Appl. No. 13/027,021, Jul. 2, 2013, 11 pages.

"Non-Final Office Action", U.S. Appl. No. 13/084,284, Oct. 3, 2013, 28 pages.

"Non-Final Office Action", U.S. Appl. No. 13/084,284, Dec. 12, 2012, 20 pages.

"Notice of Allowance", U.S. Appl. No. 12/978,162, Nov. 30, 2012, 12 pages.

"Notice of Allowance", U.S. Appl. No. 13/017,460, Nov. 30, 2012, 14 pages.

"Notice of Allowance", U.S. Appl. No. 13/027,021, Mar. 12, 2014, 6 pages.

"Notice of Allowance", U.S. Appl. No. 13/084,284, Feb. 28, 2014, 9 pages.

"Restriction Requirement", U.S. Appl. No. 13/027,021, Apr. 4, 2013, 7 pages.

"Supplemental Notice of Allowance", U.S. Appl. No. 13/027,021, Jun. 10, 2014, 4 pages.

Bohn, et al.,' "Double Hinge Axial Claims", U.S. Appl. No. 13/017,460, Jan. 31, 2011, pp. 1-17.

Bohn, et al.,' "Double Hinge Radial Claims", U.S. Appl. No. 12/978,162, Dec. 23, 2010, pp. 1-16.

Bohn, et al.,' "Double Hinge Torsion Bar", U.S. Appl. No. 13/027,021, Feb. 14, 2011, pp. 1-18.

Bohn, et al.,' "Hinge Electrical Interconnection Guide", U.S. Appl. No. 13/024,506, Feb. 10, 2010, pp. 1-19.

Falcone, "Microminiature Connector Solutions for Wireless Handheld Devices", Retrieved from: <http://www.ecnmag.com/Products/2009/08/Microminiature-Connector-Solutions-for-Wireless-Handheld-Devices/> on Oct. 11, 2010, Aug. 21, 2009, 4 pages.

Kelander, et al.,' "Modeling for High-Speed Interconnects in Mobile Device Hinge Structures", In Proceedings of 2006 Electronics Systemintegration Technology Conference, Available at <http://ieeexplore.ieee.org/stamp/stamp.jsp?tp=&arnumber=4060770>, Sep. 2006, pp. 485-490.

Ruhfass, "Review: Samsung's Double Jointed SCH-u740", Retrieved from: <http://www.mobileburn.com/review.jsp?Id=3188> on Oct. 27, 2010, Mar. 1, 2007, 2 pages.

Wattanajantra, "Fujitsu dual-touchscreen concept phone will have you feeling double", Retrieved from: <http://crave.cnet.co.uk/mobiles/fujitsu-dual-touchscreen-concept-phone-will-have-you-feeling-double-50001064/> on Oct. 8, 2010, Oct. 7, 2010, 11 pages.

"Final Office Action", U.S. Appl. No. 13/024,506, Sep. 8, 2014, 9 pages.

"Foreign Office Action", CN Application No. 201210029063.0, Oct. 14, 2014, 9 Pages.

"Non-Final Office Action", U.S. Appl. No. 13/024,506, Nov. 14, 2014, 9 pages.

"Final Office Action", U.S. Appl. No. 13/024,506, Apr. 30, 2015, 13 pages.

PORTABLE DEVICE AND MOBILE PHONE WITH DOUBLE HINGE TORSION BAR

RELATED APPLICATIONS

This application is a continuation of and claims priority to U.S. patent application Ser. No. 13/027,021, filed on Feb. 14, 2011, the disclosure of which is incorporated by reference herein.

BACKGROUND

Mobile phones and portable devices are increasingly common, and many include dual displays and/or a display device that opens and closes relative to a handheld base of a device. For example, a mobile computer device can be hinged to open two display devices, each integrated into a side or half of the device housing. However, hinge mechanisms can include relatively complex rotating hinges and hardware components to position the display screens for use, and may bind when two hinges operate independently to open the housing sections of a device. Hinge mechanisms can also be obtrusive when configured between display devices and/or may take up space that would otherwise be utilized to implement a larger display device. Users typically want the smallest possible devices to conveniently carry in a pocket or purse, but also want devices with larger display surfaces.

SUMMARY

This summary is provided to introduce simplified concepts of a double hinge torsion bar that is further described below in the Detailed Description. This summary is not intended to identify essential features of the claimed subject matter, nor is it intended for use in determining the scope of the claimed subject matter.

A double hinge torsion bar is described. In embodiments, a portable device includes a first housing integrated with a display device, and a second housing movably coupled to the first housing. Double hinges attach to the first and second housings of the portable device, and the double hinges are operable to open and close the first and second housings relative to each other. A torsion bar movably couples the double hinges to open and close at approximately a same timing rate, which can prevent the double hinges from binding when the first and second housings are opened and closed relative to each other.

In other embodiments, the double hinges each include a set of double hinge cams, and the double hinge cams can be implemented as axial cams or radial cams. The double hinges are operable with a first actuation and a second actuation to sequence opening the first and second housings of the portable device, and are further operable to reverse-sequence closing the first and second housings. The double hinges also each include a hinge link that couples a set of double hinge cams, and the torsion bar movably couples the hinge links of the double hinges. In an implementation, the torsion bar connects the hinge links of the double hinges as a pivot point through the hinge links for one of the double hinge cams in a double hinge. The torsion bar can be implemented to couple the double hinges external relative to the first and second housings of the portable device, or internal relative to the first and second housings of the portable device.

BRIEF DESCRIPTION OF THE DRAWINGS

Embodiments of a double hinge torsion bar are described with reference to the following drawings. The same numbers are used throughout the drawings to reference like features and components.

DETAILED DESCRIPTION

A double hinge torsion bar is described. In embodiments, a portable device, such as mobile phone or computer device, with two housing sections includes double hinges that each include a hinge chassis designed to attach to the housing sections of the portable device. The double hinges are movably coupled together by a torsion bar to open and close the double hinges at approximately a same timing rate to prevent the double hinges from binding when the first and second housings are opened and closed relative to each other. The torsion bar can be located internally or externally to the portable device, and keeps the double hinges moving together, such as when one hinge doesn't open or close at the same rate as the other hinge. Additionally, the torsion bar adds stability to a double hinge assembly in a portable device that includes independent components, such as the hinges and housing sections of the device. The torsion bar couples the double hinges to form a double hinge assembly that stabilizes the double hinges and keeps the timing to open and close the double hinges together.

While features and concepts of the described systems and methods for a double hinge torsion bar can be implemented in any number of different environments, systems, devices, and/or various configurations, embodiments of a double hinge torsion bar are described in the context of the following example devices, systems, and configurations.

Figure 1:
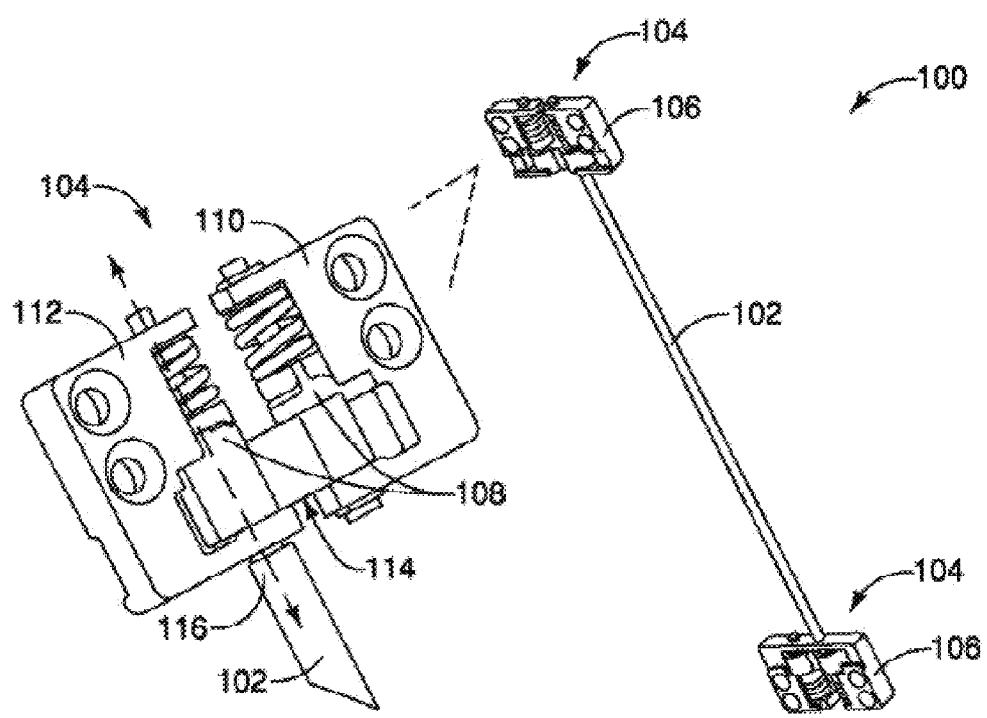
FIG. 1 illustrates an example of a double hinge assembly that includes a torsion bar coupled to double hinges with axial cams in accordance with one or more embodiments.

FIG. 1 illustrates an example of a double hinge assembly 100 that includes a torsion bar 102 coupled to double hinges 104 with axial cams in accordance with one or more embodiments. The double hinge assembly can be implemented in any type of portable device, such as a mobile phone or laptop computer, that is designed to open and close. For example, a portable device may include two housing sections that are attached to a hinge chassis 106 of the double hinges, which are operable to open and close a first housing of a device relative to a second housing of the device. The housing sections of the portable device can be rotated from a closed position at approximately zero degrees (0°) to an open position at approximately one-hundred and eighty degrees (180°) with the double hinges. The double hinges may also be implemented to rotate the housing sections of the portable device approximately three-hundred and sixty degrees (360°) relative to each other.

In this example, the hinge chassis 106 of the double hinges 104 includes a set of axial cams 108 that are further described with reference to FIG. 3. The hinge chassis of the double hinges is shown in an open position and has a first half 110 and a second half 112, both designed to attach to the housing sections of a portable device. The double hinges are both operable for a first actuation and a second actuation to sequence opening the first and second housings of the portable device, and are further operable to reverse-sequence closing the first and second housings of the portable device.

The double hinges 104 each include a hinge link 114 that couples the set of axial cams 108 in the hinge chassis. The torsion bar 102 couples the first double hinge to the second double hinge and is implemented to open and close the double hinges at approximately a same timing rate to prevent the double hinges from binding when the housing sections of a portable device are opened and closed relative to each other. In embodiments, the torsion bar couples to the hinge links of the double hinges, and may be connected to any part of the hinge links. For example, the torsion bar can be implemented as a pivot point at 116 through the hinge links of the double hinges for one of the axial cams in the set of axial cams for a double hinge.

Figure 2:
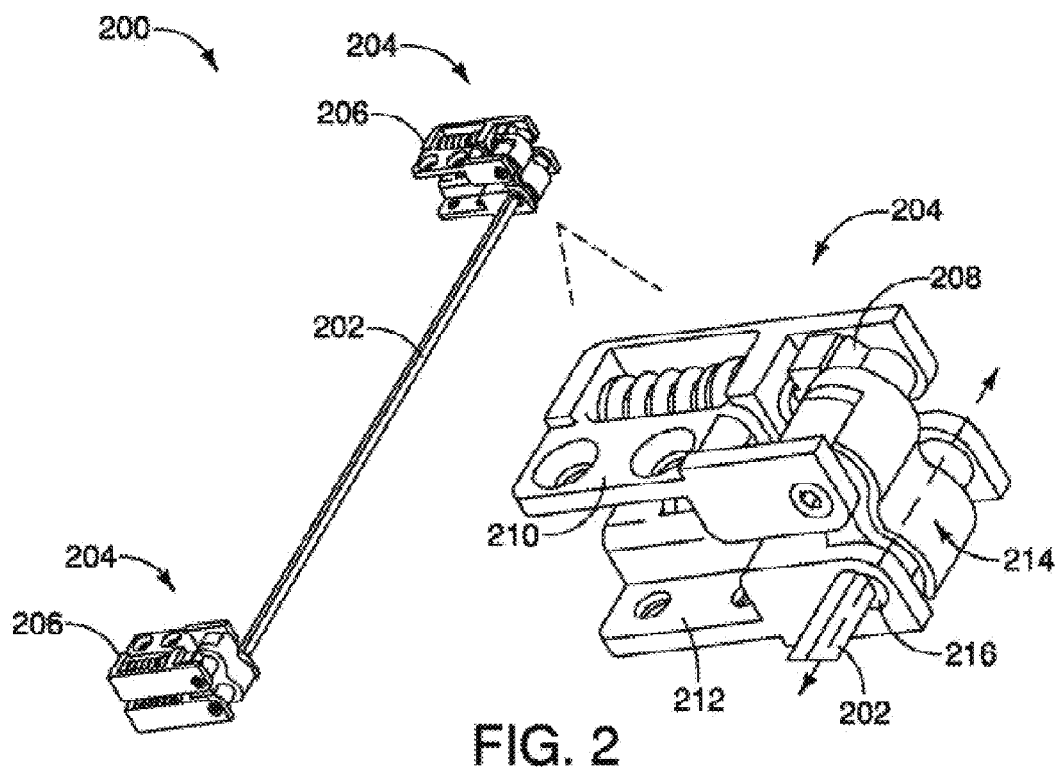
FIG. 2 illustrates another example of a double hinge assembly that includes a torsion bar coupled to double hinges with radial cams in accordance with one or more embodiments.

FIG. 2 illustrates another example of a double hinge assembly 200 that includes a torsion bar 202 coupled to double hinges 204 with radial cams in accordance with one or more embodiments. As described above, the double hinge assembly can be implemented in any type of portable device, such as a mobile phone or laptop computer, that is designed to open and close. For example, a portable device may include two housing sections that are attached to a hinge chassis 206 of the double hinges, which are operable to open and close a first housing of a device relative to a second housing of the device.

In this example, the hinge chassis 206 of the double hinges 204 includes a set of radial cams 208 that are further described with reference to FIG. 4. The hinge chassis of the double hinges is shown in a closed position and has a first half 210 and a second half 212, both designed to attach to the housing sections of a portable device. The double hinges are both operable for a first actuation and a second actuation to sequence opening the first and second housings of the portable device, and are further operable to reverse-sequence closing the first and second housings of the portable device.

The double hinges 204 each include a hinge link 214 that couples the set of radial cams 208 in the hinge chassis. The torsion bar 202 couples the first double hinge to the second double hinge and is implemented to open and close the double hinges at approximately a same timing rate to prevent the double hinges from binding when the housing sections of a portable device are opened and closed relative to each other. In embodiments, the torsion bar couples to the hinge links of the double hinges, and may be connected to any part of the hinge links. For example, the torsion bar can be implemented as a pivot point at 216 through the hinge links of the double hinges for one of the radial cams in the set of radial cams for a double hinge.

Figure 3:
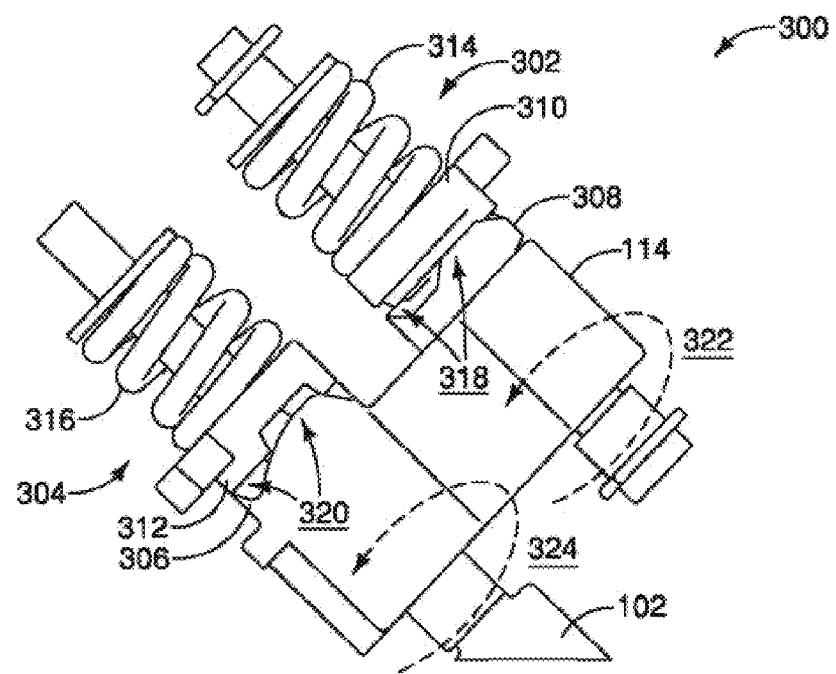
FIG. 3 illustrates an example of the double hinge axial cams as described with reference to FIG. 1 in accordance with one or more embodiments.

FIG. 3 illustrates an example 300 of the double hinge axial cams described with reference to FIG. 1. The double hinge axial cams include the torsion bar 102 and the hinge link 114, as well as two cam-and-follower mechanisms 302, 304. The hinge link has an integrated cam 306 (e.g., molded or constructed as an integral component of the hinge link), and has a removable cam 308 (e.g., keyed to lock in position relative to the hinge link when installed). The first cam-and-follower mechanism 302 includes a cam follower 310 and the removable cam 308. Similarly, the second cam-and-follower mechanism 304 includes a cam follower 312 and the integrated cam 306. The first cam-and-follower mechanism 302 also includes a tensioner spring 314, and the second cam-and-follower mechanism 304 includes a tensioner spring 316. The tensioner springs apply a force to push the respective cam followers against cam lobes of the corresponding axial cams.

The cam followers 310, 312 have stops that hold them in a fixed position relative to the respective cams 308, 306 as the hinge link rotates.

The removable cam 308 has cam lobes 318 that actuate against the first cam follower 310. Similarly, the integrated cam 306 has cam lobes 320 that actuate against the second cam follower 312. In an implementation, each of the cams are balanced with three cam lobes evenly spaced every one-hundred and twenty degrees (120°). A force vector having a force and a direction of the force is created where a cam lobe contacts a cam follower, and the shape of the cam and the cam follower change the force vector and the applied torque. In an alternate embodiment, the double hinge can be implemented as a friction hinge, and the cam-and-follower mechanisms are operable to actuate based on friction between a cam and a cam follower.

The torsion bar 102 couples the hinge link 114 to a second hinge link (not shown), such as when two of the double hinge axial cams are installed in a portable device (e.g., on opposite ends or sides of the portable device). The double hinge can be implemented as a bistable hinge mechanism that is operable with a first actuation at 322 and a second actuation at 324 to sequence closing, and is then operable to reverse-sequence when opening.

The first cam-and-follower mechanism 302 closes the first half of the double hinge (e.g., at 322) with less applied torque before the second cam-and-follower mechanism 304 closes the second half of the double hinge (e.g., at 324). The first cam-and-follower mechanism 302 also opens the first half of the double hinge with less applied torque before the second cam-and-follower mechanism 304 opens the second half of the double hinge. In an implementation, a cam face of the first cam follower 310 is a different shape than the second cam follower 312, and the shape difference of the cam face is operable on the removable cam 308 to apply less torque.

Figure 4:
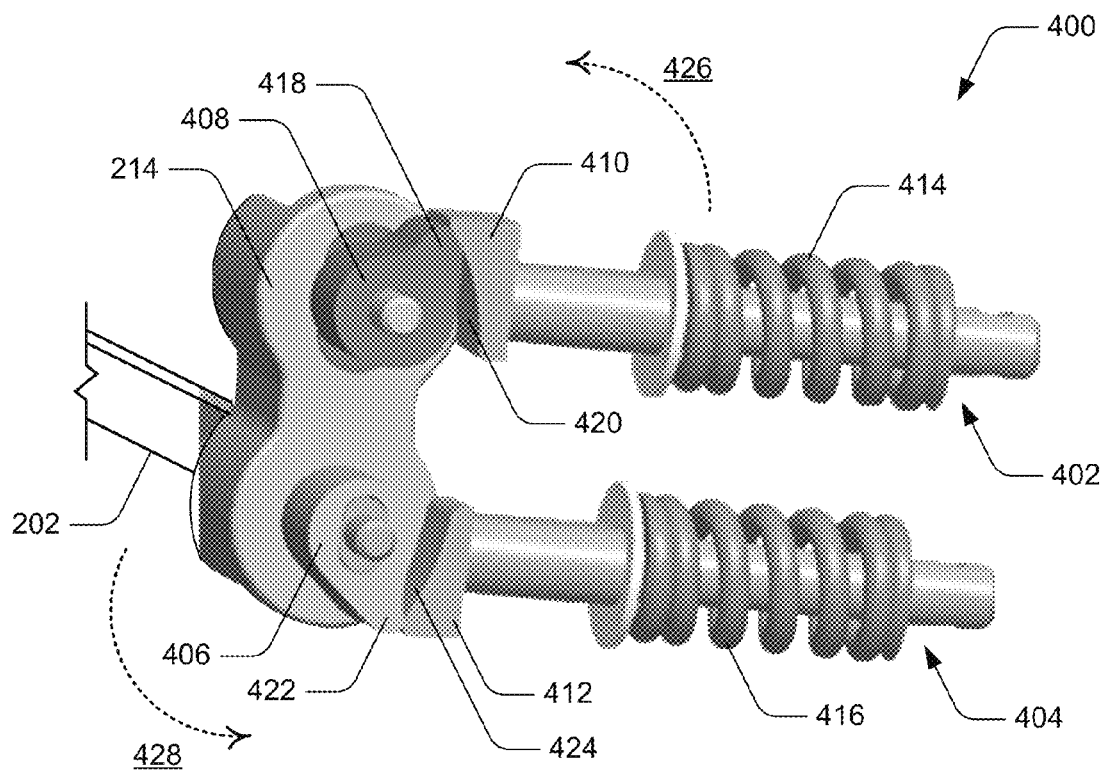
FIG. 4 illustrates an example of the double hinge radial cams as described with reference to FIG. 2 in accordance with one or more embodiments.

FIG. 4 illustrates an example 400 of the double hinge radial cams described with reference to FIG. 2. The double hinge radial cams include the torsion bar 202 and the hinge link 214, as well as two cam-and-follower mechanisms 402, 404. The hinge link has an integrated cam 406 (e.g., molded or constructed as an integral component of the hinge link), and has a removable cam 408. The first cam-and-follower mechanism 402 includes a cam follower 410 and the removable cam 408. Similarly, the second cam-and-follower mechanism 404 includes a cam follower 412 and the integrated cam 406. The first cam-and-follower mechanism 402 also includes a tensioner spring 414, and the second cam-and-follower mechanism 404 includes a tensioner spring 416. The tensioner springs push the respective cam followers against cam lobes of the corresponding the radial cams.

The removable cam 408 has a cam lobe 418 that actuates against a cam face 420 the first cam follower 410. Similarly, the integrated cam 406 has a cam lobe 422 that actuates against a cam face 424 of the second cam follower 412. A force vector having a force and a direction of the force is created where a cam lobe contacts a cam face of a cam follower, and the shape of the cam and the cam follower change the force vector and the applied torque. In an alternate embodiment, the double hinge can be implemented as a friction hinge, and the cam-and-follower mechanisms are operable to actuate based on friction between a cam and a cam face of a cam follower.

The torsion bar 202 couples the hinge link 214 to a second hinge link (not shown), such as when two of the double hinge radial cams are installed in a portable device (e.g., on opposite ends or sides of the portable device). The double hinge can be implemented as a bistable hinge mechanism that is operable with a first actuation at 426 and a second actuation at 428 to sequence opening, and is then operable to reverse-sequence when closing.

The first cam-and-follower mechanism 402 opens the first half of the double hinge (e.g., at 426) with less applied torque before the second cam-and-follower mechanism 404 opens the second half of the double hinge (e.g., at 428). The first cam-and-follower mechanism 402 also closes the first half of the double hinge with less applied torque before the second cam-and-follower mechanism 404 closes the second half of the double hinge. In an implementation, the cam face 420 of the first cam follower 410 is a different shape than the second cam follower 412, and the shape difference of the cam face 420 is operable on the cam 408 to apply less torque.

Figure 5:
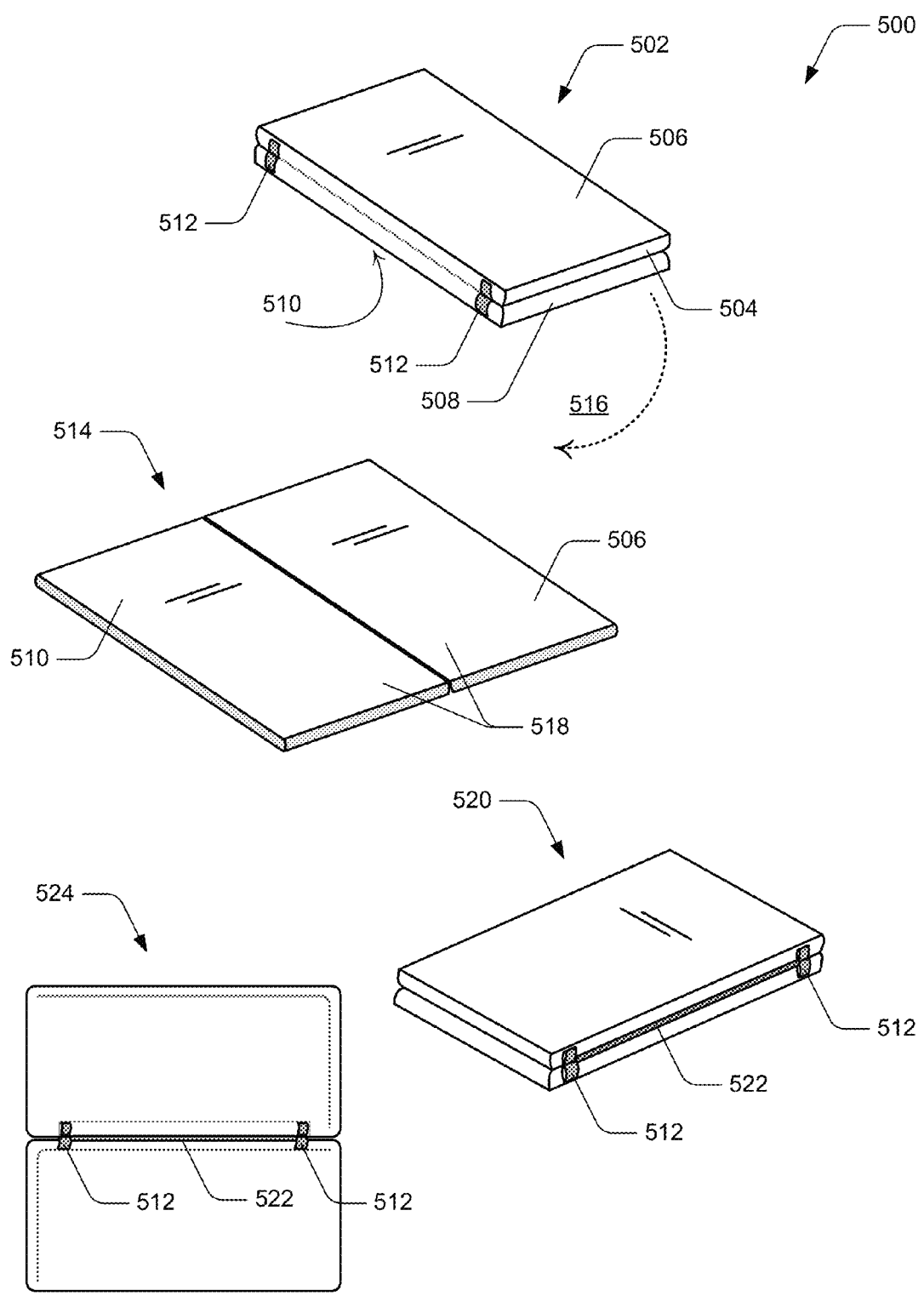
FIG. 5 illustrates examples of a portable device implemented with a double hinge torsion bar in accordance with one or more embodiments.

FIG. 5 illustrates examples of a portable device 500 that can be implemented to include double hinges and a torsion bar in accordance with embodiments described herein. In embodiments, the portable device may be any form of a consumer, computer, user, communication, phone, navigation, television, appliance, gaming, media playback, and/or electronic device. In a first view 502, the portable device is shown in a closed position. The portable device has a first housing 504 with an integrated display device 506, and also has a second housing 508 that may include a physical keyboard or an additional display device 510 (e.g., on the underside of the portable device as shown in this example). Correspondingly, the display devices are viewable from opposite sides of the portable device in the closed position of the first and second housings (also referred to herein as an anti-book mode).

The first housing 504 is movably coupled to the second housing 508 by the double hinges 512, installed in the device between the display devices and operable to open from the closed position at approximately zero degrees (0°) to an open position at approximately one-hundred and eighty degrees (180°), as well as rotated through approximately three-hundred and sixty degrees (360°). In a second view 514, the portable device 500 is shown in an open position, such as when the second housing 508 is rotated around and up at 516 to position the display device 506 and the additional display device 510 adjacent each other to form a surface display 518 (e.g., the two display devices appear as one larger display surface). In the open position, the double hinges are not visible, and are designed to allow the display devices coming together in the open position.

In embodiments, the torsion bar couples together the double hinges either external relative to the first and second housings of the portable device, or internal relative to the first and second housings of the portable device. For example, in the first view 502, the torsion bar is internal in the portable device (e.g., the torsion bar is not shown or visible when the portable device is closed). In a third view 520, the portable device is shown in a closed position and the double hinges 512 are coupled by the torsion bar 522, which is shown external to the housings of the portable device. In a fourth view 524, the portable device is shown in an open position and the double hinges 512 are coupled by the torsion bar 522, which is shown external to the housings of the portable device.

Figure 6:
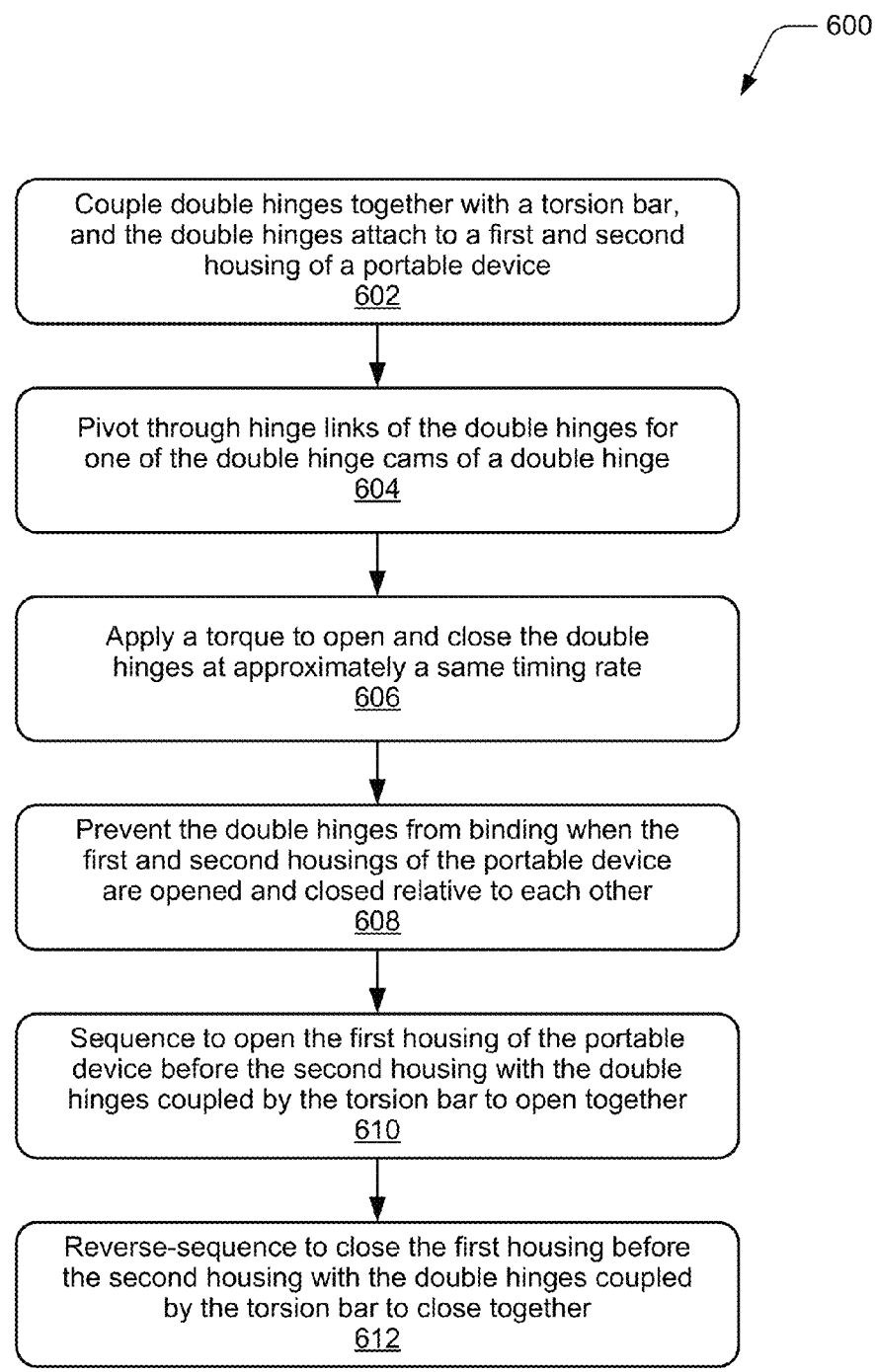
FIG. 6 illustrates example method(s) of a double hinge torsion bar in accordance with one or more embodiments.

FIG. 6 illustrates example method(s) 600 of a double hinge torsion bar. The order in which the method blocks are described are not intended to be construed as a limitation, and any number of the described method blocks can be combined in any order to implement a method, or an alternate method.

At block 602, double hinges are coupled together with a torsion bar, and the double hinges attach to a first and second housing of a portable device. For example, the double hinge assembly 100 (FIG. 1) includes the torsion bar 102 that movably couples the double hinges 104, and the hinge chassis 106 of each double hinge is designed to attach to housing sections of a portable device. The double hinges 104 each include a set of axial cams and a hinge link 114 that couples the axial cams in the hinge chassis. Similarly, the double hinge assembly 200 (FIG. 2) includes the torsion bar 202 that movably couples the double hinges 204, and the hinge chassis 206 of each double hinge is designed to attach to housing sections of a portable device. The double hinges 204 each include a set of radial cams and a hinge link 214 that couples the radial cams in the hinge chassis. The double hinges 104, 204 are operable to open and close the housing sections of the portable device relative to each other, such as with a first actuation to open a first housing of the portable device before a second housing, and with a second actuation to close the first housing of the portable device before the second housing.

At block 604, the torsion bar pivots through hinge links of the double hinges for one of the double hinge cams of a double hinge. For example, a double hinge 104 includes the hinge link 114 that couples the set of axial cams 108, and the torsion bar 102 is a pivot point at 116 through the hinge links of the double hinges for one of the axial cams in the set of axial cams for a double hinge. Similarly, a double hinge 204 includes the hinge link 214 that couples the set of radial cams 208, and the torsion bar 202 is a pivot point at 216 through the hinge links of the double hinges for one of the radial cams in the set of radial cams for a double hinge.

At block 606, a torque is applied to open and close the double hinges at approximately a same timing rate and, at block 608, the double hinges are prevented from binding when the first and second housings of the portable device are opened and closed relative to each other. For example, the torsion bar 102 is implemented to open and close the double hinges 104 (with the axial cams) at approximately a same timing rate to prevent the double hinges from binding when the housing sections of a portable device are opened and closed relative to each other. Similarly, the torsion bar 202 is implemented to open and close the double hinges 204 (with the radial cams) at approximately a same timing rate to prevent the double hinges from binding when the housing sections of a portable device are opened and closed relative to each other.

At block 610, the first housing of the portable device is opened in a sequence before the second housing with the double hinges coupled by the torsion bar to open together. For example, the axial cams of the double hinges 104 that are coupled by the torsion bar 102 are operable to open the first housing of the portable device in a sequence before the second housing. Similarly, the radial cams of the double hinges 204 that are coupled by the torsion bar 202 are operable to open the first housing of the portable device in a sequence before the second housing.

At block 612, the first housing of the portable device is closed in a reverse-sequence before the second housing with the double hinges coupled by the torsion bar to close together. For example, the axial cams of the double hinges 104 that are coupled by the torsion bar 102 are operable to close the first housing of the portable device in a reverse-sequence before the second housing. Similarly, the radial cams of the double hinges 204 that are coupled by the torsion bar 202 are operable to close the first housing of the portable device in a reverse-sequence before the second housing.

Although embodiments of a double hinge torsion bar have been described in language specific to features and/or methods, the subject of the appended claims is not necessarily limited to the specific features or methods described. Rather, the specific features and methods are disclosed as example implementations of a double hinge torsion bar.

The invention claimed is:

1. A portable device, comprising:
   a first housing integrated with a display device;
   a second housing movably coupled to the first housing;
   double hinges attached to the first and second housings, and operable to open and close the first and second housings relative to each other;
   a torsion bar extending along a long axis and connecting each of the double hinges, the long axis intersecting through a single hinge link of the double hinges as a pivot point, the torsion bar being configured to movably couple the double hinges to open and close at approximately the same timing rate; and
   the double hinges being disposed along the long axis of the torsion bar, the long axis being generally parallel to a plane defined by the first housing when in the closed position.

2. The portable device as recited in claim 1, wherein the torsion bar is further configured to prevent the double hinges from binding when the first and second housings are opened and closed relative to each other.

3. The portable device as recited in claim 1, wherein the double hinges each include a set of double hinge cams, and wherein the double hinge cams comprise axial cams or radial cams.

4. The portable device as recited in claim 3, wherein the double hinges each include a hinge link configured to couple the set of double hinge cams, and wherein the torsion bar is further configured to movably couple the hinge links of the double hinges.

5. The portable device as recited in claim 4, wherein the torsion bar is further configured as a pivot point through the hinge links of the double hinges for one of the double hinge cams in the respective sets of double hinge cams.

6. The portable device as recited in claim 1, wherein the double hinges are operable with a first actuation and a second actuation to sequence opening the first and second housings, and further operable to reverse sequence closing the first and second housings.

7. The portable device as recited in claim 1, wherein the torsion bar is further configured to couple the double hinges external relative to the first and second housings of the portable device, or internal relative to the first and second housings of the portable device.

8. A method, comprising:
   coupling double hinges together with a torsion bar that extends along a long axis, the long axis intersecting through a single hinge link of the double hinges as a pivot point, the double hinges attached to a first housing of a portable device and attached to a second housing of the portable device, the double hinges operable to open and close the first and second housings relative to each other, the hinges being disposed along the long axis of the torsion bar, the long axis being generally parallel to a plane defined by the first housing when in the closed position; and
   operating the double hinges to open and close the double hinges at approximately a same timing rate in response to an applied torque.

9. The method as recited in claim 8, further comprising preventing the double hinges from binding when the first and second housings of the portable device are opened and closed relative to each other.

10. The method as recited in claim 8, wherein:
    the double hinges each include a set of double hinge cams and a hinge link that couples the set of double hinge cams; and
    the torsion bar movably couples the hinge links of the double hinges.

11. The method as recited in claim 10, further comprising pivoting through the hinge links of the double hinges for one of the double hinge cams in the respective sets of double hinge cams.

12. The method as recited in claim 10, wherein double hinge cams of a double hinge are operable for a first actuation to open the first housing of the portable device before the second housing, and are further operable for a second actuation to close the first housing of the portable device before the second housing.

13. The method as recited in claim 8, further comprising:
    sequencing to open the first housing of the portable device before the second housing with the double hinges coupled by the torsion bar to open together; and
    reverse-sequencing to close the first housing of the portable device before the second housing with the double hinges coupled by the torsion bar to close together.

14. A mobile phone, comprising:
    a first housing integrated with a display device;
    a second housing movably coupled to the first housing;
    double hinges attached to the first and second housings, and operable to open and close the first and second housings relative to each other;
    a torsion bar extending along a long axis and connecting each of the double hinges, the long axis intersecting through a single hinge link of the double hinges as a pivot point, the torsion bar being configured to movably couple the double hinges to open and close at approximately the same timing rate; and
    the double hinges being disposed along the long axis of the torsion bar, the long axis being generally parallel to a plane defined by the first housing when in the closed position.

15. The mobile phone as recited in claim 14, wherein the torsion bar is further configured to prevent the double hinges from binding when the first and second housings are opened and closed relative to each other.

16. The mobile phone as recited in claim 14, wherein the double hinges each include a set of double hinge cams, and wherein the double hinge cams comprise axial cams or radial cams.

17. The mobile phone as recited in claim 16, wherein the double hinges each include a hinge link configured to couple the set of double hinge cams, and wherein the torsion bar is further configured to movably couple the hinge links of the double hinges.

18. The mobile phone as recited in claim 17, wherein the torsion bar is further configured as a pivot point through the hinge links of the double hinges for one of the double hinge cams in the respective sets of double hinge cams.

19. The mobile phone as recited in claim 14, wherein the double hinges are operable with a first actuation and a second actuation to sequence opening the first and second housings, and further operable to reverse sequence closing the first and second housings.

20. The mobile phone as recited in claim 14, wherein the torsion bar is further configured to couple the double hinges external relative to the first and second housings of the portable device, or internal relative to the first and second housings of the portable device.

* * * * *